Patented July 3, 1951

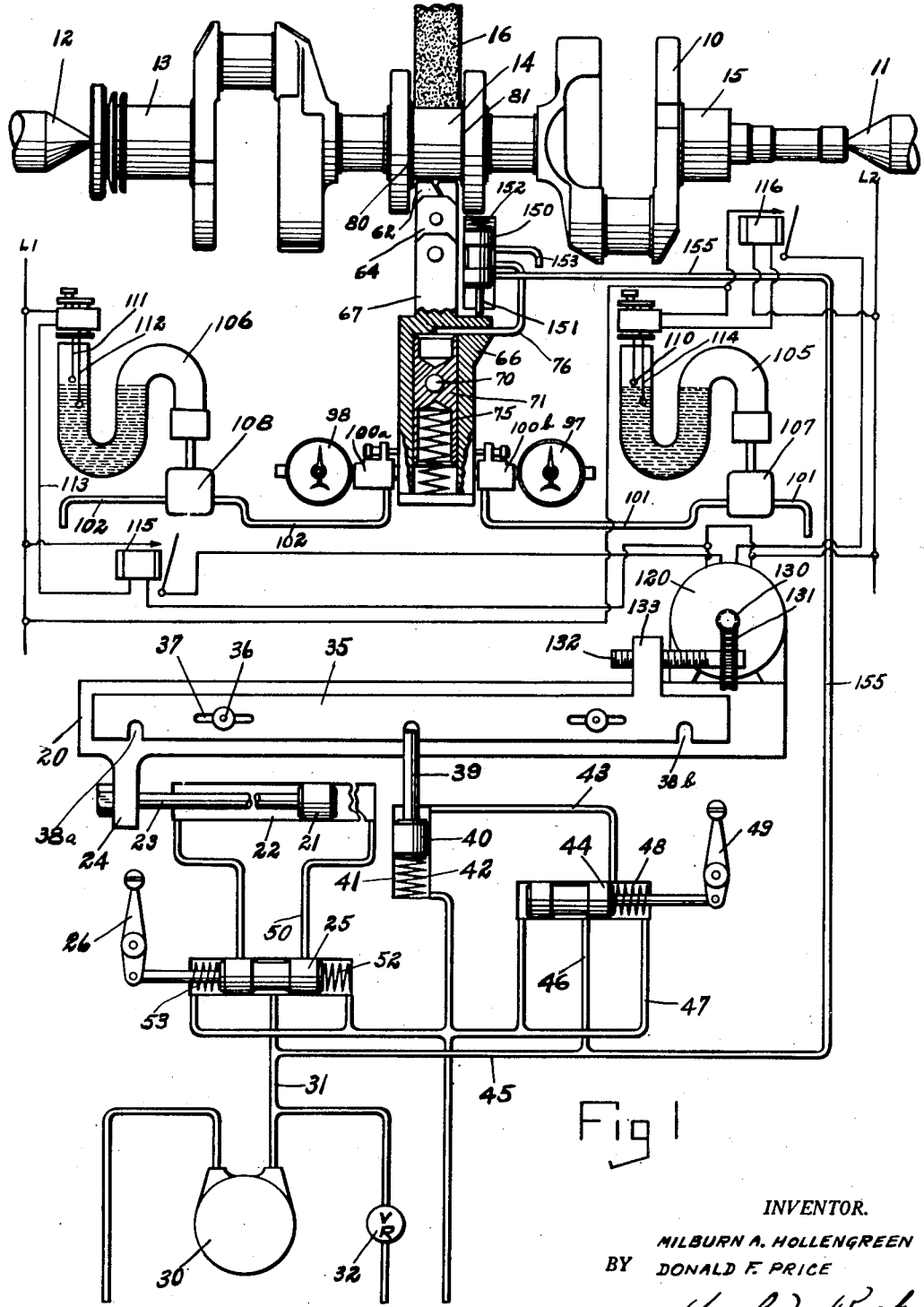

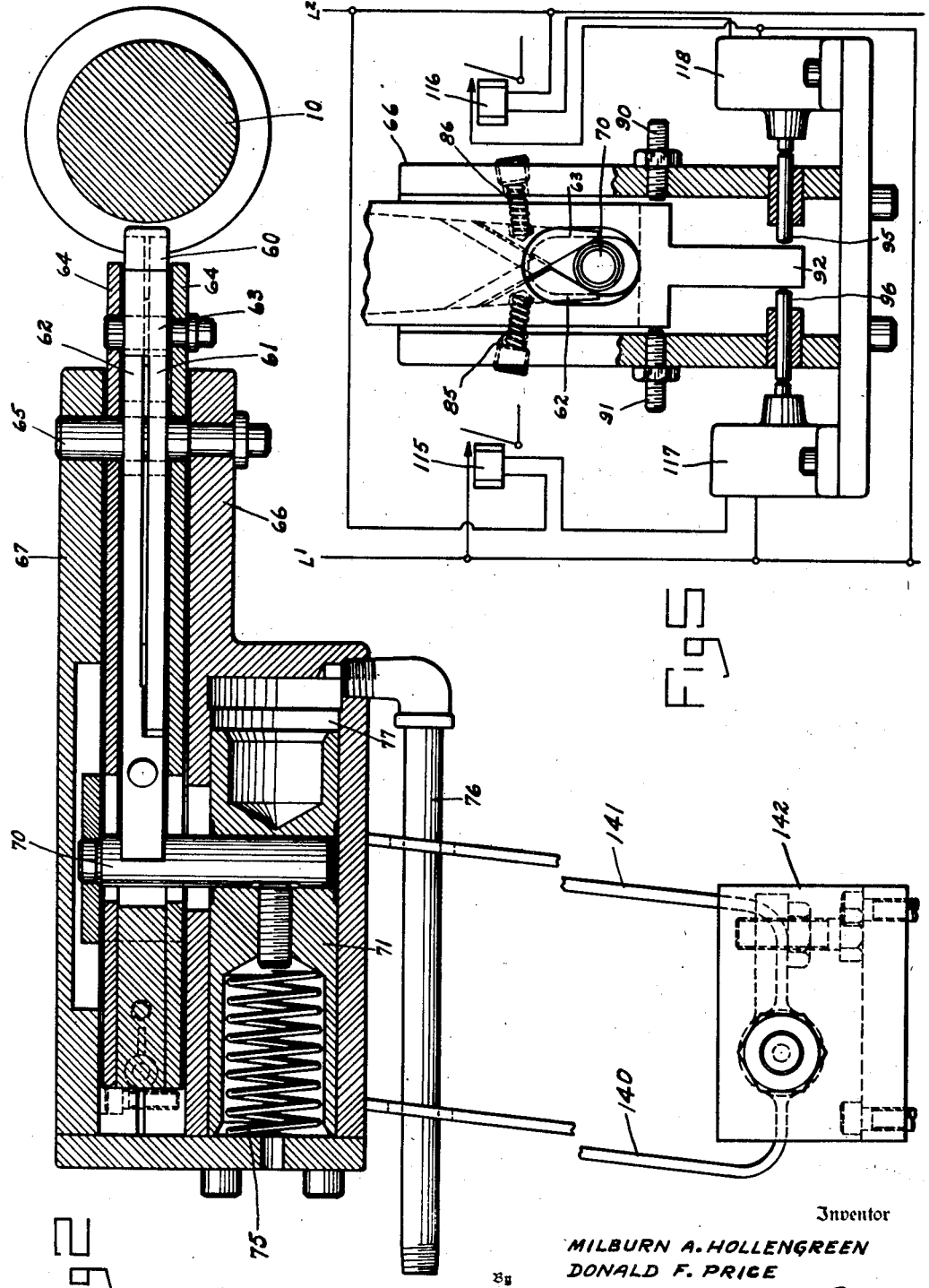

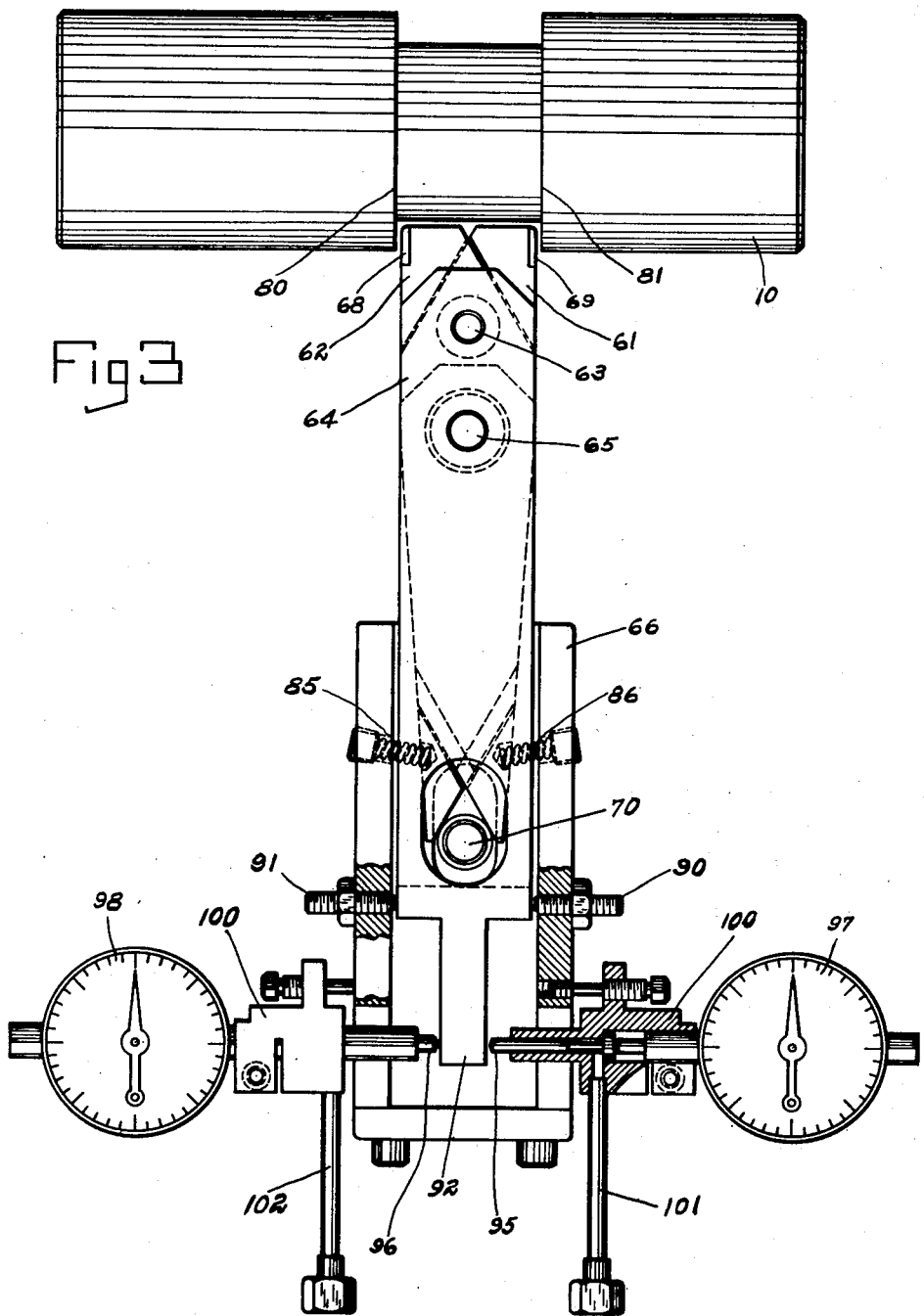

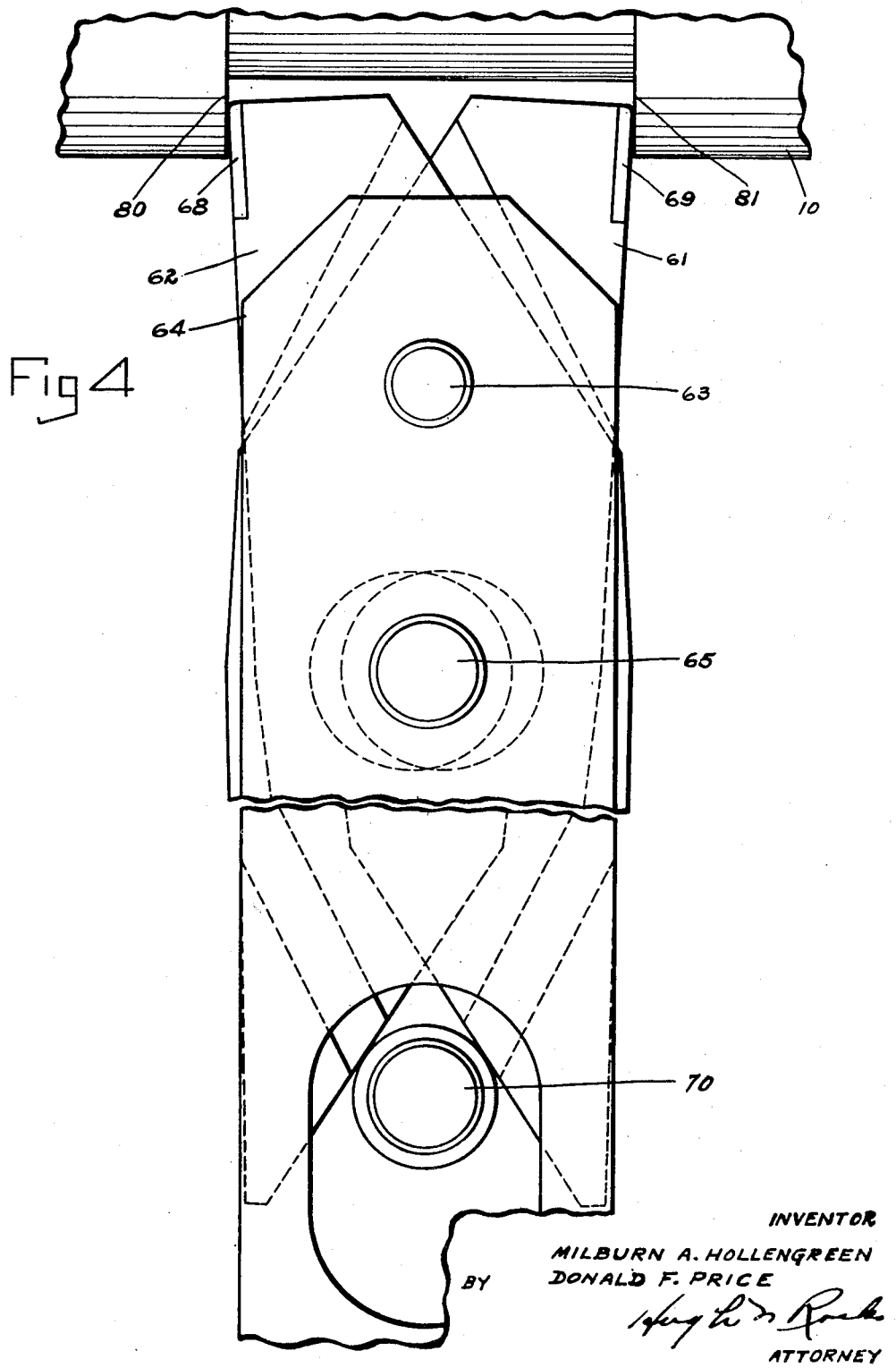

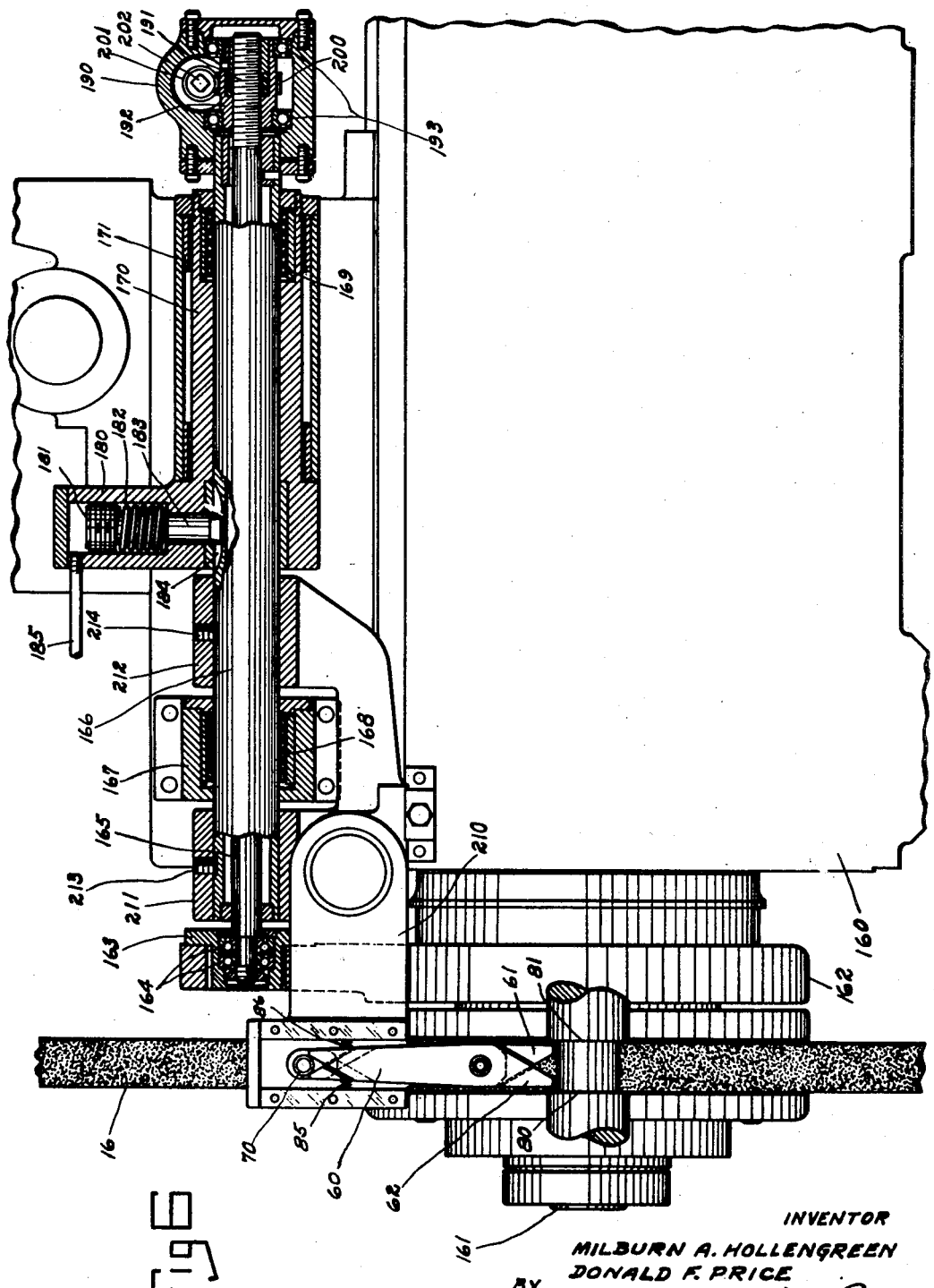

2,559,431

UNITED STATES PATENT OFFICE 2,559,431

WORK LOCATING DEVICE

Milburn A. Hollengreen and Donald F. Price, Waynesboro, Pa., assignors to Landis Tool Company, Waynesboro, Pa.

Application November 25, 1949, Serial No. 129,422

9 Claims. (Cl. 51—165)

This invention relates to apparatus for use in connection with grinding or machining of cylindrical portions of a work piece between flanges, cheeks, shoulders or other portions of greater diameter adjoining the surface to be machined.

More particularly, this invention relates to apparatus for relatively positioning successive portions of a work piece and a cutting tool when the machining must be done simultaneously on the spaced shoulders or flanges as well as the cylindrical surface. This requires that the portion to be ground or machined and the tool must be accurately centered relative to one another so that the tool will remove an approximately equal amount of stock from each shoulder. When so centered, the several portions will be accurately positioned with relation to other similar portions on the same work piece.

When a rough cast or forged crankshaft is turned or milled, the spacing between bearing surfaces is not held to close limits. When it is placed in a crank pin grinder having a spacing bar and plunger, the spacing of the pin bearings usually does not agree exactly with the notches on said spacing bar and a relative axial adjustment must be made between the work and the grinding wheel so that the grinding wheel will grind equally on each shoulder.

It is, therefore, an object of this invention to provide means for effecting relative axial positioning between the tool and the flanges or shoulders of a work piece.

It is a further object to provide a work engaging device having means for engaging the spaced shoulders or flanges of a work piece.

It is a further object to provide means for urging the work engaging means toward the work surface in order to properly engage the shoulders or flanges.

It is a further object to provide a preliminary and approximate positioning operation supplemented by a more exact positioning operation.

A further object is to locate successively a series of portions on a work piece in operative relation to a cutting tool.

The drawings show a diagrammatic arrangement of a work piece in the form of a crankshaft having a plurality of spaced portions to be ground, as well as hydraulic and electrical systems for causing a locating movement between the work and the tool and the apparatus for accurately locating said parts after each indexing operation.

Figure 1 is a combined hydraulic and electrical diagram.

Figure 2 is a left-hand elevation, partly in section.

Figure 3 is a plan view.

Figure 4 is an enlarged plan view of the work engaging unit.

Figure 5 is an alternate arrangement.

Figure 6 is a front elevation, partly in section, showing the invention applied to the grinding wheel instead of the work carriage.

Numeral 10 indicates a crankshaft mounted on footstock center 11 and headstock center 12 for grinding the main bearings 13, 14, and 15. The crank could just as well be mounted in eccentric clamping fixtures which are well-known in the art for grinding the crankpins. The locating apparatus would function in the same manner to locate the crankpins relative to grinding wheel 16 as it does to locate the main bearings.

Crank 10 and centers 11 and 12 are mounted on carriage 20 in a manner well-known in the art but not disclosed in the drawing.

Carriage 20 may be moved endwise by means of a piston 21 and cylinder 22 connected by piston rod 23 to a portion 24 in the lower side of said carriage. Fluid under pressure is supplied alternately to opposite ends of cylinder 22 by means of a reversing valve 25. Said valve may be actuated automatically in a manner such as disclosed in Patents 2,105,841 and 2,323,189. However, for the purpose of illustration, the lever 26 is sufficient.

Fluid under pressure is supplied to valve 25 by pump 30 through line 31. A relief valve 32 connected to the outlet of said pump serves to regulate the pressure in the hydraulic system. The above-mentioned patents also show automatic means for indexing a work carriage. It is sufficient for our purpose to show spacing bar 35 adjustably mounted on carriage 20 by means of screws 36 in longitudinal slots 37 in said spacing bar.

On the lower side of said spacing bar is a plurality of notches 38 spaced to correspond to the spacing of the portions to be ground on the work piece. A plunger 39 in the form of a piston rod having a piston 40 attached thereto and operable in a cylinder 41 is held in engagement with the spacing bar 35 by means of a spring 42. Said plunger may be withdrawn from said spacing bar by fluid under pressure directed through line 43 from valve 44.

Said fluid under pressure is supplied to said valve from line 31 through lines 45 and 46. In the drawing, valve 44 is in a position to direct fluid from piston 40 through line 43 to exhaust passage 47. Valve 44 is held in this position by spring 48. Said valve may be moved by lever 49 to connect pressure line 46 with line 43.

The means for engaging the work piece consists of a scissorslike member 60 having two elements 61 and 62 pivoted at 63 and supporting plates 64. Each of said elements has a circular opening back of the pivot point through which a pin 65 of smaller diameter passes. Said pin is mounted in a housing member 66 at one side of said work engaging member and passes through a cover plate 67 at the other side of said work engaging member.

The portion of element 61 and 62 opposite the work engaging end is made so that together they form an inverted V. A pin 70 engages the sides of said V. Said pin is mounted in a piston 71 in a cylindrical opening 77 in housing 66 and is urged into engagement with the sides of said V by spring 75. When so urged, said pin tends to actuate members 61 and 62 so that the work engaging portions, consisting of two hardened surfaces 68 and 69, engage one or the other of opposed shoulders 80 and 81 on work piece 10. For example, when surface 69 engages shoulder 81, it is an indication that the work piece is too far to the left to be engaged properly by the grinding wheel. Engagement between these two surfaces will cause pivot 63 to move to left and the entire work engaging assembly 64 to move in a counterclockwise direction about pivot 65. Said piston and feelers are reset by introducing fluid under pressure from line 76 to the opposite end of cylinder 77.

Members 61 and 62 are normally held in a central position by springs 85 and 86. Oscillating movement of the work engaging assembly is limited by adjusting screws 90 and 91, which are positioned to engage the sides of plate member 64. Said plate member has an extended portion 92 which passes between the feelers 95 and 96 of two indicator members 97 and 98 of the type disclosed in co-pending application Ser. No. 773,388, filed September 11, 1947, which issued as Patent No. 2,533,770, each of which has an air valve 100 operable in conjunction with the actuation of the indicator as described in said application.

Each of said air valves receives a supply of fluid under pressure which is permitted to escape when said valve is actuated by extended portion 92. Said fluid under pressure is conducted from any suitable source through lines 101 or 102. A manometer tube 105 is connected to line 101 and tube 106 is connected to line 102 through Venturi devices 107 and 108. These devices as well as their relation to the manometer tube are disclosed in greater detail in Patents 2,001,447, issued May 14, 1935, and 2,019,066, issued October 29, 1935.

Contacts 110 and 114 in tube 105 and 111 and 112 in tube 106, when engaged by the mercury column, serve to initiate operation of motor 120 on carriage 20 in a direction depending upon which manometer tube is functioning. Said motor operating through worm gear 130, worm wheel 131, screw 132 rotatably mounted in a lug 133 on spacing bar 35 causes carriage 20 to move relative to spacing bar 35, which is held in position by plunger 39, to effect a substantially exact positioning or locating operation of the work piece 10.

An alternate arrangement shown in Figure 5 uses micro switches 117 and 118 instead of the air-operated apparatus. Said switches may be connected directly to relays 115 and 116.

Housing 66 must be mounted for movement toward and from operative relation to the work piece. Movement may be effected manually, by power manually controlled, or automatically. For illustrative purposes, we disclose said housing mounted on parallel flat springs 140 and 141, which in turn are mounted on a base member 142. With this arrangement, the operator may push housing 66 forward to operative position, hold it there until the locating operation is completed, and then release it so that the springs 140 and 141 may return it to inoperative position.

In order to permit spring 75 to function at the proper time, a valve 150 is located in any suitable position to be actuated by the forward movement of housing 66. Said valve has a stem 151, which is engaged by a portion of housing 66 as it moves toward operative position. Said movement shifts valve 150 against spring 152 to connect the end of cylinder 77 through line 76 with an exhaust passage 153. When housing 66 is released to return to inoperative position, valve 150 is shifted by spring 152 to connect line 76 with line 155, which in turn is connected to line 45 to direct fluid under pressure to shift piston 71 against spring 75 and move pin 70 out of contact with the feeler elements 61 and 62.

In Figure 6 is disclosed an alternate method of effecting relative lateral or axial adjustment between a grinding wheel and a shouldered work piece. This method involves endwise adjustment of the grinding wheel. Grinding wheel 16 is rotatably supported on a wheel base 160 by means of a spindle 161, which is rotatably mounted in suitable bearings in said wheel base. Bracket 162 engages the rotatable portion of the wheel mounting in any suitable manner for the purpose of effecting a slight endwise movement thereof. Said bracket should be connected to the wheel mounting at a point as close as possible to the grinding wheel so as to eliminate variations in the position of the wheel due to expansion of the spindle during operation.

At the upper portion of said bracket, there is inserted a bearing cartridge 163 having anti-friction bearings 164 in which one end of a shaft 165 is supported. Said shaft extends through a sleeve 166, one end of which is rotatably and slidably mounted in a bracket 167 having sleeve-type anti-friction bearings 168 therein. Said bracket is mounted on wheel base 160. The other end of said sleeve is supported in a similar manner in bearings 169 mounted in a sleeve 170. Said sleeve, in turn, is mounted in a hollow cylindrical portion 171 on wheel base 160. A portion of sleeve 170 extends beyond housing 171 and has a radial cylinder 180 formed thereon. Piston 181 in said cylinder is urged outwardly by means of spring 182. A piston rod or clamp 183 protrudes from said cylinder into engagement with a slot 184 in sleeve 166. Said clamp may be held in operative position by fluid under pressure directed to the head end of cylinder 180 from pump 30 through line 185.

At the other end of sleeve 166 is a means for effecting axial adjustment between said sleeve and shaft 165 and, therefore, between the wheel shifting mechanism and the work locating member 60. This adjusting mechanism consists of a housing 190 secured to the end of sleeve 166. The end of shaft 165 passes through said housing and has a threaded portion 191 thereon in engagement with a nut 192 rotatably mounted in bearings 193. A worm wheel 200 on nut 192 is engaged by worm gear 201 mounted in the upper part of housing 190. Said worm has a portion 202 of polygonal cross-section so that a wrench or crank may be applied thereto.

The means for engaging the work 10 is the same as disclosed in the other figures except that, instead of having means at one end to actuate indicators, it is mounted in a member 210, forming a connection between said feeler 60 and the wheel shifting mechanism described above. Said member 210 has a pair of spaced hollow cylindrical portions 211 and 212, one on either side of bracket 167. The sleeve 166 passes through both of these portions and is secured therein by means of set screws 213 and 214. This mounting provides a pivotal support for the work engaging member 60 so that, when not in use, it may be swung upwardly to inoperative position, supported by sleeve 166.

Operation

For the purpose of illustration, we have used as a work piece, crank shaft 10 mounted on centers 11 and 12 for grinding main bearings 13, 14, and 15. The locating device would work just as well if said crank were mounted eccentrically for grinding the crankpins.

Assuming that main bearing 13 has been ground, the operator shifts lever 49 to the left to supply fluid under pressure from line 46 to line 43, and the plunger end of cylinder 41 to shift piston 40 and plunger 39 downwardly against spring 42. Plunger 39 is thus withdrawn from notch 38a. Lever 26 is shifted to the left and valve 25 to the right to connect line 31 through line 50 to the head end of cylinder 22. As soon as carriage 20 begins to move, lever 49 may be released and valve 44 will be moved to the left by spring 48 to a position to connect line 43 with exhaust line 47. Spring 42 will then raise piston 40 and plunger 39 into engagement with spacing bar 35 so that, as soon as notch 38b moves into position, plunger 39 will enter said notch and stop the carriage 20 in approximate position to grind bearing 14.

As soon as the carriage 20 stops, the operator may release lever 26, and valve 25 will be returned to neutral position by spring 52. A similar spring 53 will move said valve to neutral position from the opposite direction.

When carriage 20 comes to rest, the member 60 is moved toward the work but is stopped at a point out of actual contact therewith. The stop may be made by any suitable means provided for this purpose. In actual practice, this movement would probably be effected automatically. However, for the purpose of illustration, we show the locator mounted on resilient members 140 and 141 so that the device may be moved into and held in operative position manually. As soon as it has performed its function, it will be returned to inoperative position by said members 140 and 141.

As said locator is moved into operative position, it engages the stem 151 of valve 150 and moves said valve against the action of spring 152. Said valve connects line 76 with exhaust 153 to release fluid from the forward end of piston 71. Said piston is moved forward by means of spring 75; and pin 70, mounted in said piston, in response to said movement, spreads the members 61 and 62 laterally in the direction of shoulders 80 and 81 on work piece 10. Assuming that the location of the carriage 20 by plunger 39 and notch 38b has stopped in a position with shoulder 81 slightly closer to the member 61 than shoulder 80 is to the member 62, said members will spread until member 61 engages shoulder 81 and before member 62 engages shoulder 80.

The spreading action will thus cause member 64 as a unit to move counterclockwise against spring 86. Portion 92, when thus moved, shifts feeler 95 to reduce the flow of air through valve 100b so that pressure is built up in the manometer tube 105, shifting the body of mercury therein to complete a circuit from 114 through contact 110, which is always submerged in the body of mercury, through the mercury to the contact 111, line 113 to relay 116, which completes a circuit to motor 120 to rotate it in such a direction that carriage 20 will be moved slightly to the right.

Movement to the left is effected in a similar manner when the work is located off center to the right. The work engaging member 62 engages shoulder 80 instead of shoulder 81, and the unit in response to the action of pin 70 moves to the left or clockwise about pivot 65 so that extended portion 92 engages feeler 95 to shift valve 100a to control the flow of air so as to raise the level of the mercury in the contact portion of the tube 106. The rising column of mercury completes a circuit between contacts 112 and 111 to energize relay 115. Said relay completes a circuit to motor 120 to rotate said motor in such a direction as to move carriage 20 to the left until work engaging member 60 has resumed its normal position and valve 100 returns to position to permit the mercury in tube 106 to drop away from contact 111 and stop motor 120 with the carriage 20 in the desired position.

In the meantime, feelers 61 and 62 have spread to the point where feeler 62 is engaging shoulder 80; and thus both feelers are in contact with the respective shoulders. The movement of the carriage 20 to the right will shift the feeler unit so that the portion 92 will move away from feeler 95. The mercury in the tube 105 will drop away from contact 110, and motor 120 will stop. The work piece 10 will then be in a position for the grinding wheel 16 to engage both shoulders equally.

After the work engaging member 60 in Figure 6 has been moved into operative position, the feeler members 61 and 62 are spread apart by the action of spring 75. If the position of the axial work piece relative to the grinding wheel is such that feeler member 61 engages shoulder 81 as said work engaging member moves into position, then the spreading action will cause the work engaging member 60 as well as the bracket 210, sleeve 166, shaft 165, bracket 162, and hence the grinding wheel 16, to move to the left. This movement will continue until feeler 62 engages shoulder 80, thus stopping the spreading action and the movement to the left caused thereby. The size of the grinding wheel and the shoulders 80 and 81 of the work piece are now in exact alignment, and the grinding wheel will grind equally on both shoulders. As soon as the work and wheel are centered, fluid under pressure can be directed either manually or automatically through line 185 to cylinder 180 in order to clamp the locating mechanism, and hence the grinding wheel, in the adjusted position.

If, for any reason, the work engaging member should get out of alignment with the grinding wheel, adjustment may be effected by applying a wrench or crank to the portion 202 of worm gear 201. Turning said worm gear will rotate nut 192 and cause shaft 165 to move endwise due to the threaded portion 191 in said nut. This will cause a relative axial movement between work engaging member 60 and grinding wheel 16, so that the two may be rotated to proper alignment.

We claim:

1. In a machine tool, a work support, a tool support, means for effecting relative longitudinal movement between said supports, a work locating device for positioning a work piece having opposed shoulder portions relative to said tool, comprising a work engaging unit having scissorslike work engaging elements, means for spreading said elements into engagement with said spaced shoulder portions, said elements being pivotally mounted so that, if the work is not in alignment with the tool, one of the work engaging elements will contact the corresponding shoulder before the other, said work engaging unit being rotatable about said pivot in a direction away from the shoulder in response to continued spreading of said work engaging elements, and means responsive to the movement of said unit to set in operation said longitudinal moving means for moving the work in a direction to center said shoulder portions relative to said tool.

2. In a machine tool for machining spaced cylindrical portions of a work piece, each having opposed shoulder portions, a work support, a tool support, a cutting tool mounted thereon, means for effecting relative longitudinal movement between said supports to successively position said cylindrical portions and said cutting tool in operative relation, including a spacing bar for one of said supports having spaced notches corresponding to the portions to be ground, a plunger for engaging said notches to position said supports in approximate operative relation, a work locating device having means for engaging said shoulder portions, and means separate from said longitudinal moving means and actuated by said locating device to effect a precision adjustment between said member and said spacing bar, whereby to place said tool and one of said portions of said work piece in substantially exact alignment.

3. In a metal working machine, a device for relatively locating a cutting tool and a work piece having spaced shoulder portions, said device comprising a scissorslike work engaging member having feelers for contacting said shoulder portions, a base for supporting said member, means for spreading said feelers into engagement with said shoulder portions including a piston, connections between said piston and said feelers for actuating same, means for urging said piston in a direction to spread said work engaging members, and means operable alternately with said last-named means for urging said piston in the opposite direction.

4. In a metal working machine, a device for relatively locating a cutting tool and a work piece having spaced shoulder portions, comprising scissorslike work engaging feelers, a base for supporting said feelers, means for spreading said feelers into engagement with said shoulder portions, including a piston, connections between said piston and said feelers for actuating same, means for urging said piston in a direction to spread said feelers, means for holding said piston in inoperative position, and means operable upon movement of said locating device into operative position for releasing said holding means.

5. In a grinding machine, means for rotatably supporting the work piece, a grinding wheel support and means for rotatably supporting a grinding wheel thereon, a locating device for positioning said grinding wheel relative to spaced shoulders on a work piece, comprising a work engaging unit having scissorslike work engaging elements, means for spreading said elements into engagement with said spaced shoulders, said elements being pivotally mounted so that, if the work is off center, one of the work engaging members will contact its corresponding shoulder before the other, connections between said work engaging element and the portion of said wheel supporting member adjacent said grinding wheel, said connecting means being responsive to continued spreading of said work engaging elements to move said grinding wheel into a predetermined position relative to said spaced shoulders.

6. In a grinding machine for grinding spaced cylindrical portions of a work piece, each having opposed shoulder or flanged portions, a grinding wheel support, a grinding wheel rotatably mounted thereon, a work supporting means, means for effecting relative axial movement between said work and said wheel to successively position said cylindrical portions and said grinding wheel in operative relation, including a spacing bar for one of said members having spaced notches corresponding to the portions to be ground, a plunger for engaging said notches to position said members in approximate operative relation, a work locating device having means for engaging said shoulder portions, and connections between said locating device and said wheel mounting at a point adjacent said wheel to effect a precision adjustment of said grinding wheel relative to said shoulder portions.

7. In a grinding machine, means for rotatably supporting a work piece, a grinding wheel support and means for rotatably supporting a grinding wheel thereon, a locating device for positioning said grinding wheel relative to spaced shoulders on a work piece, comprising a work engaging unit having scissorslike work engaging elements normally in alignment with said grinding wheel, means for spreading said elements into engagement with said spaced shoulders, said elements being pivotally mounted so that, if the work is not in alignment with the grinding wheel, one of the work engaging members will contact its corresponding shoulder before the other, connections between said work engaging element and the portion of said wheel supporting member adjacent said grinding wheel, said connecting means being responsive to continued spreading of said work engaging elements to move said grinding wheel into a predetermined position relative to said spaced shoulders, and means for effecting relative axial adjustment between said work engaging member and said grinding wheel.

8. In a grinding machine, a grinding wheel support, a work carriage, means for effecting relative longitudinal movement between said wheel support and said carriage, a work locating device for effecting a relative positioning movement between spaced shoulders on work pieces and a grinding wheel, comprising a work engaging unit having scissorslike work engaging elements, means for spreading said elements into engagement with said spaced shoulders, said elements being pivotally mounted so that, if the work is not in alignment with the grinding wheel, one of the work engaging elements will contact the corresponding shoulder before the other, and means responsive to continued spreading of said work engaging elements to initiate said relative longitudinal movement to place the grinding wheel and spaced shoulders on the work piece in alignment.

9. In a grinding machine, a work support, a grinding wheel rotatably mounted thereon, a grinding wheel support, means for effecting relative axial movement between said supports, a work locating device for positioning work pieces having opposed shoulder portions relative to a grinding wheel, comprising a scissorslike work engaging member positioned in operative relation to said shoulder portions, and means actuated by said work engaging member when said shoulder portions are out of alignment with said grinding wheel to initiate said relative axial movement between said work and said wheel to place said parts in a predetermined position, said means being effective to stop said relative axial movement when said predetermined position is reached.

MILBURN A. HOLLENGREEN.
DONALD F. PRICE.

REFERENCES CITED

The following references are of record in the file of this patent:

UNITED STATES PATENTS

| Number | Name | Date |
|---|---|---|
| 1,640,993 | Hanson | Aug. 30, 1927 |
| 1,840,231 | Harrison et al. | Jan. 5, 1932 |
| 2,220,490 | Ott et al. | Nov. 5, 1940 |
| 2,264,160 | Flygare et al. | Nov. 25, 1941 |